(12) United States Patent
Kim et al.

(10) Patent No.: US 9,077,477 B2
(45) Date of Patent: Jul. 7, 2015

(54) CONTINUOUS-MODE WAVELENGTH CONVERSION APPARATUS, BURST-MODE WAVELENGTH CONVERSION APPARATUS, REMOTE TERMINATION APPARATUS AND CENTRAL OFFICE TERMINATION APPARATUS

(75) Inventors: Kwang-Ok Kim, Jeonju-si (KR); Han-Hyub Lee, Daejeon-si (KR); Sang-Soo Lee, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 355 days.

(21) Appl. No.: 13/335,040

(22) Filed: Dec. 22, 2011

(65) Prior Publication Data
US 2012/0163823 A1 Jun. 28, 2012

(30) Foreign Application Priority Data
Dec. 23, 2010 (KR) .................. 10-2010-0133791

(51) Int. Cl.
*H04J 14/02* (2006.01)
*H04B 10/00* (2013.01)

(52) U.S. Cl.
CPC ........... *H04J 14/0227* (2013.01); *H04J 14/026* (2013.01); *H04J 14/0282* (2013.01)

(58) Field of Classification Search
CPC .. H04J 14/0227; H04J 14/026; H04J 14/0282
See application file for complete search history.

(56) References Cited

U.S. PATENT DOCUMENTS

| | | | |
|---|---|---|---|
| 2005/0078684 A1* | 4/2005 | Wolf et al. | 370/395.51 |
| 2007/0092250 A1* | 4/2007 | Bouda et al. | 398/71 |
| 2010/0034534 A1 | 2/2010 | Niibe et al. | |
| 2010/0226649 A1 | 9/2010 | Cheng et al. | |
| 2011/0135306 A1* | 6/2011 | Kim et al. | 398/68 |
| 2011/0142443 A1* | 6/2011 | Hirth et al. | 398/25 |
| 2011/0311235 A1* | 12/2011 | Li et al. | 398/182 |
| 2012/0063770 A1* | 3/2012 | Tsuji | 398/25 |
| 2012/0148245 A1* | 6/2012 | Bowler et al. | 398/58 |
| 2013/0108272 A1* | 5/2013 | Miura | 398/72 |

FOREIGN PATENT DOCUMENTS

| | | | |
|---|---|---|---|
| KR | 10-2009-0071922 | | 7/2009 |
| WO | WO 2010/091556 | * | 8/2010 |
| WO | WO 2010/143258 | * | 12/2010 |

* cited by examiner

*Primary Examiner* — Shi K Li
*Assistant Examiner* — Mina Shalaby
(74) *Attorney, Agent, or Firm* — Staas & Halsey LLP

(57) ABSTRACT

A continuous-mode wavelength converting apparatus, a burst-mode wavelength converting apparatus, a remote termination apparatus and a central office termination apparatus for converting a burst-mode upstream wavelength signal into a continuous-mode upstream wavelength signal, and thereby transmitting the signal to a long distance and increasing link capacity. The continuous-mode wavelength converting apparatus may convert a received burst-mode upstream electric signal into a continuous-mode upstream electric signal by inserting a first frame at the front of the signal as an indicator of a start of the signal, inserting a second frame at the end of the burst-mode upstream electric signal as an indicator of an end of the signal, and inserting an idle signal into at least one remaining region of the burst-mode upstream electric signal.

7 Claims, 4 Drawing Sheets

US 9,077,477 B2

CONTINUOUS-MODE WAVELENGTH CONVERSION APPARATUS, BURST-MODE WAVELENGTH CONVERSION APPARATUS, REMOTE TERMINATION APPARATUS AND CENTRAL OFFICE TERMINATION APPARATUS

CROSS-REFERENCE TO RELATED APPLICATION(S)

This application claims the benefit under 35 U.S.C. §119 (a) of Korean Patent Application No. 10-2010-0133791, filed on Dec. 23, 2010, in the Korean Intellectual Property Office, the entire disclosure of which is incorporated herein by reference for all purposes.

BACKGROUND

1. Field

The following description relates to a repeating technology for providing long-distance transmission and increasing in link capacity in an Ethernet passive optical network (EPON) that supports a service at multiple rates.

2. Description of the Related Art

Currently, a time division multiplexing-passive optical network (TDM-PON) uses 1 Gbps Ethernet PON (EPON) and 2.5 Gbps gigabit capable PON (GPON). Standardization of 1 Gbps Ethernet passive optical network (EPON) technology has been completed in IEEE802.3ah, and 1 Gbps EPON provides uplink/downlink transmission rate of maximum 1 Gbps. In contrast, standardization of 2.5 Gbps GPON technology has been completed in ITU-T G.984.x, and the 2.5 Gbps GPON technology provides a downlink transmission rate of maximum 2.5 Gbps and an uplink transmission rate of maximum 1 Gbps.

With the introduction of various multimedia services of high quality, a need for a transmission rate in an access network has been increasing. Accordingly, in IEEE802.3av standards, 10 Gbps EPON technology has been standardized, and in ITU-T G.987.x, GPON with 10 Gbps/2.5 Gbps has been standardized.

10 Gbps EPON that is standardized in IEEE802.3av has been standardized with architecture and a system that can accommodate all the existing 1 Gbps EPON subscriber, new asymmetric 10 Gbps/1 Gbps EPON subscribers and symmetric 10 Gbps EPON subscribers while using a previously established optical distribution network intact. Thus, 10 Gbps EPON allocates a 1577 nm waveband and a 1490 nm waveband for downstream transmission of 10 Gbps signals and 1 Gbps signals, respectively. Due to the difference in waveband, wavelength division multiplexing overlay (WDM) technique is used for multiplexing and transmitting such signals. In addition, 10 Gbps EPON allocates a 1270 nm waveband and a 1310 nm waveband for upstream transmission of 10 Gbps signals and 1 Gbps signals, respectively.

However, a waveband of about 1260 nm to 1360 nm is used for transmission of 1 Gbps signals, and it overlaps a waveband for transmission of 10 Gbps signals. To solve this problem, an EPON optical line terminal (OLT) divides the upstream transmission time band into a plurality of time slots, and overlapping wavelengths for both 10 Gbps and 1 Gbps signals are present in common in a single optical fiber. The wavelengths division is performed using dual rate physical media dependent (PMD) technique in the EPON OLT. For example, the dual rate PMD may transmit or receive an optical signal transmitted at transmission rates of 1G and 10G.

Researches on a technique for long-distance transmission of an optical signal and an increase in link capacity in an EPON have been actively carried out.

SUMMARY

In one general aspect, there is provided a continuous-mode wavelength converting apparatus converting a received burst-mode upstream electric signal into a continuous-mode upstream electric signal by inserting a first frame at the front of the burst-mode upstream electric signal as an indicator of a start of the signal, inserting a second frame at the end of the burst-mode upstream electric signal as an indicator of an end of the signal, and adding an idle signal to at least one remaining region of the burst-mode upstream electric signal.

The continuous-mode wavelength converting apparatus may include: a first converting unit configured to convert a first burst-mode upstream electric signal having a first transfer rate into a first continuous-mode upstream electric signal having the first transfer rate; and a second converting unit configured to convert a second burst-mode upstream electric signal having a second transfer rate into a second continuous-mode upstream electric signal having the second transfer rate.

In another general aspect, there is provided a remote termination apparatus including: a continuous-mode wavelength converting unit configured to convert a burst-mode upstream electric signal received from customer premises equipment into a continuous-mode upstream electric signal by inserting a first frame at the front of the burst-mode upstream electric signal as an indicator of a start of the signal, inserting a second frame at the end of the burst-mode upstream electric signal as an indicator of an end of the signal, and inserting an idle signal into the at least one remaining region of the burst-mode upstream electric signal; and an optical transmission and reception unit configured to convert the continuous-mode upstream electric signal into a continuous-mode upstream wavelength signal.

The remote termination apparatus may further include a dual-rate optical transmission and reception unit configured to separate the burst-mode upstream wavelength signal into a first burst-mode upstream wavelength signal having a first transfer rate and a second burst-mode upstream wavelength signal having a second transfer rate, and to convert the separated first burst-mode upstream wavelength signal into a first burst-mode upstream electric signal and the separated second burst-mode upstream wavelength signal into a second burst-mode upstream electric signal.

The continuous-mode wavelength converting unit may be further configured to include a first converting unit configured to convert the first burst-mode upstream electric signal having the first transfer rate into a first continuous-mode upstream electric signal having the first transfer rate, and a second converting unit configured to convert the second burst-mode upstream electric signal having the second transfer rate into a second continuous-mode upstream electric signal having the second transfer rate.

The remote termination apparatus may further include a frame demultiplexing unit configured to demultiplex the burst-mode upstream electric signal and transmit the demultiplexed signal to the continuous-mode wavelength converting unit, a frame multiplexing unit configured to multiplex the continuous-mode upstream electric signal and transmit the multiplexed signal to the optical transmission and reception unit, and a wavelength division multiplexing (WDM) unit configured to multiplex the continuous-mode upstream wavelength signal and transmit the multiplexed signal to a wavelength filter.

The remote termination apparatus may further include the wavelength filter configured to transmit the continuous-mode upstream wavelength signal to a central office termination (COT) apparatus.

In another general aspect, there is provided a burst-mode wavelength converting unit converting a received continuous-mode upstream electric signal into a burst-mode upstream electric signal by extracting frames as indicators of a start and an end of burst-mode upstream electric signal from the received continuous-mode upstream electric signal, and extracting the burst-mode upstream electric signal based on the extracted frames.

The burst-mode wavelength converting unit may include a first converting unit configured to convert a first continuous-mode upstream electric signal having a first transfer rate into a first burst-mode upstream electric signal and a second converting unit configured to convert a second continuous-mode upstream electric signal having a second transfer rate into a second burst-mode upstream electric signal.

In another general aspect, there is provided a central office termination (COT) apparatus including: a first optical transmission and reception unit configured to convert a continuous-mode upstream wavelength signal received from a remote termination apparatus into a continuous-mode upstream electric signal; a burst-mode wavelength converting unit configured to convert the continuous-mode upstream electric signal into a burst-mode upstream electric signal by extracting frames as indicators of a start and an end of the burst-mode upstream electric signal from the continuous-mode upstream electric signal and extracting the burst-mode upstream electric signal based on the extracted frames; and a second optical transmission and reception unit configured to convert the burst-mode upstream electric signal into a burst-mode upstream wavelength signal.

The COT apparatus may further include a first wavelength filter configured to separate the continuous-mode upstream wavelength signal into a first continuous-mode upstream wavelength signal having a first transfer rate and a second continuous-mode upstream wavelength signal having a second transfer rate; and a second wavelength filter configured to transmit the burst-mode upstream wavelength signal to an Ethernet passive optical network (EPON) optical line terminal (OLT).

The burst-mode wavelength converting unit may be further configured to include a first converting unit configured to convert a first continuous-mode upstream electric signal having the first transfer rate into a first burst-mode upstream electric signal and a second converting unit configured to convert a second continuous-mode upstream electric signal having the second transfer rate into a second burst-mode upstream electric signal.

The COT apparatus may further include a wavelength division multiplexing (WDM) unit configured to multiplex the continuous-mode upstream wavelength signal and transmit the multiplexed signal to the first optical transmission and reception unit and a frame multiplexing unit configured to multiplex the first burst-mode upstream electric signal and transmit the multiplexed signal to the second optical transmission and reception unit.

Other features and aspects may be apparent from the following detailed description, the drawings, and the claims.

Figure 1:
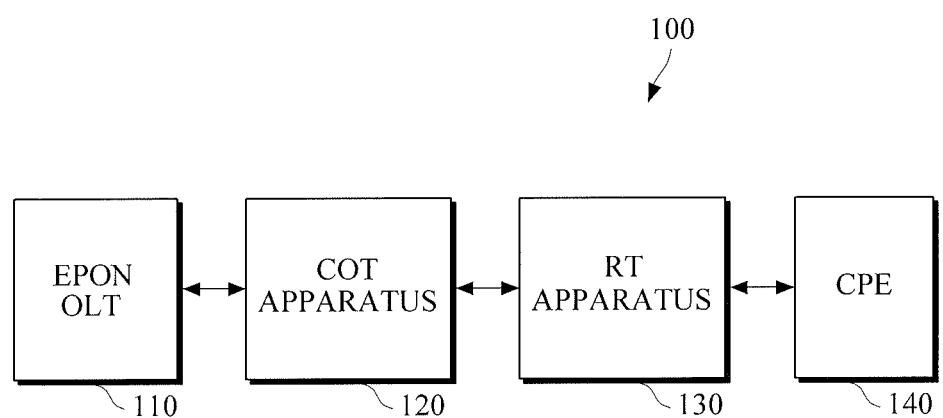
FIG. 1 is a diagram illustrating an example of an optical transmission and reception system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an optical transmission and reception system.

Referring to FIG. 1, the optical transmission and reception system 100 may include an Ethernet passive optical network (EPON) optical line terminal (OLT) 110, a central office termination (COT) apparatus 120, a remote termination (RT) apparatus 130, and customer premises equipment (CPE) 140. The central office termination apparatus 120 and the remote termination apparatus 130 are pieces of repeater equipment which are capable of transmitting or receiving a burst-mode wavelength signal as a continuous-mode wavelength signal.

The EPON OLT 110 may transmit a downstream signal of EPON wavelength to the COT apparatus 120.

The COT apparatus 120 may transmit the downstream signal from the EPON OLT 110 to the RT apparatus 130 over a different WDM wavelength band.

The RT apparatus 130 may transmit the downstream signal received from the COT apparatus 120 to the CPE 140. In a case where more than one piece of CPE 140 exist, an optical splitter may be provided between the RT apparatus 130 and the CPE 140. The optical splitter enables to split the received downstream signal into multiple downstream signals, and the split downstream signals may be transmitted to the respective pieces of CPE 140.

On the other hand, the CPE 140 may transmit an upstream wavelength signal in burst mode (hereinafter, referred to as "burst-mode upstream wavelength signal") to the RT apparatus 130.

The RT apparatus 130 may convert the burst-mode upstream wavelength signal received from the CPE 140 into a continuous-mode upstream wavelength signal. The RT apparatus 130 may transmit the burst-mode upstream wavelength signal to the COT apparatus 120. The RT apparatus 130 will be described in further detail later with reference to FIG. 2.

The COT apparatus 120 may convert a continuous-mode upstream wavelength signal received from the RT apparatus 130 into a burst-mode upstream wavelength signal. The COT apparatus 120 may transmit the burst-mode upstream wavelength signal to the EPON OLT 110. The COT apparatus 120 will be described in more detail later with reference to FIG. 3.

In receiving an upstream signal, the RT apparatus may convert a burst-mode upstream wavelength signal into a continuous-mode upstream wavelength signal and transmit the converted signal to the COT apparatus, and the COT apparatus may convert the continuous-mode upstream wavelength signal into a burst-mode upstream wavelength signal. As a result, the signal can be transmitted for a long distance, and link capacity can be increased as well.

In addition, the RT apparatus may convert a burst-mode upstream wavelength signal into a continuous-mode upstream wavelength signal and transmit the converted signal to the COT apparatus, and the COT apparatus may convert the continuous-mode upstream wavelength signal into a burst-mode upstream wavelength signal. Thus, there is no need for a costly wavelength-division multiplexing (WDM) optical module to transmit a burst-mode upstream wavelength signal.

Figure 2:
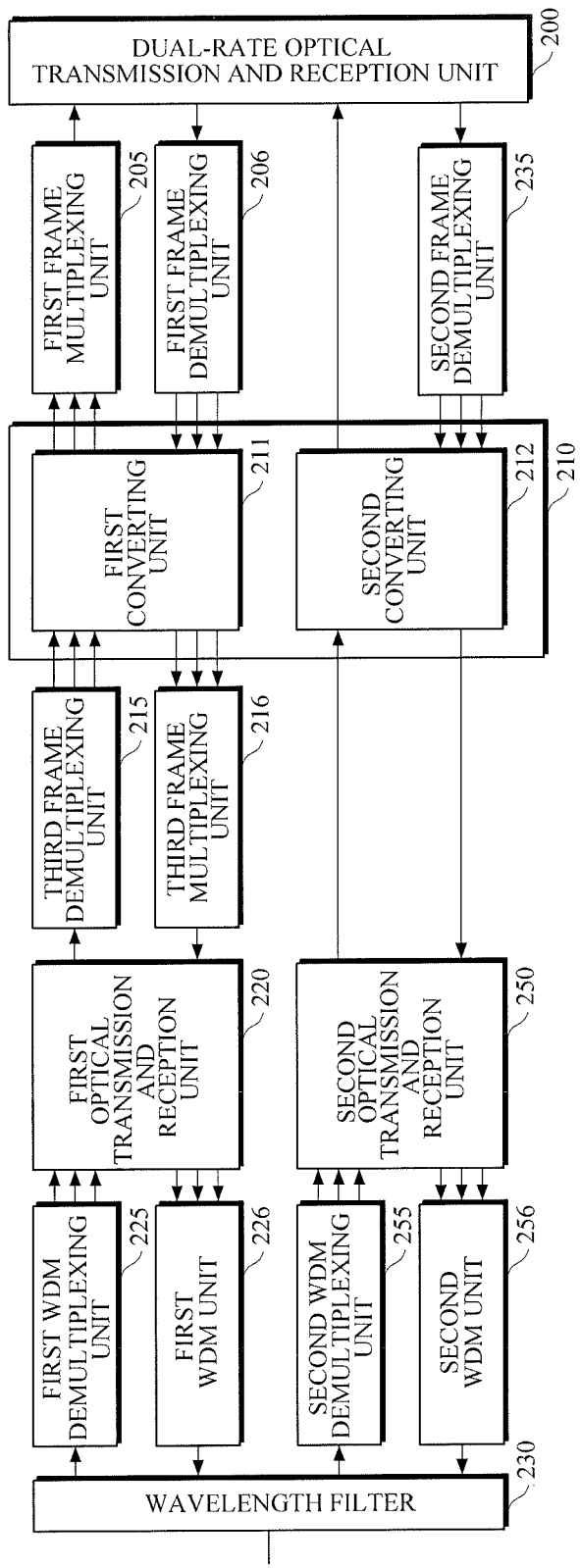
FIG. 2 is a diagram illustrating an example of a remote termination (RT) apparatus shown in the example illustrated in FIG. 1.

FIG. 2 illustrates an example of the RT apparatus shown in the example illustrated in FIG. 1.

Referring to FIG. 2, the RT apparatus may include a dual-rate optical transmission and reception unit 200, a first frame multiplexing unit 205, a first frame demultiplexing unit 206, a continuous-mode wavelength converting unit 210, a third frame demultiplexing unit 215, a third frame multiplexing unit 216, a first optical transmission and reception unit 220, a first WDM demultiplexing unit 225, a first WDM unit 226, a wavelength filter 230, a second frame demultiplexing unit 235, a second optical transmission and reception unit 250, a second WDM demultiplexing unit 255, and a second WDM unit 256. The optical transmission and reception unit refers to an optical module or an optical transceiver.

The first frame multiplexing unit 205 and the third frame multiplexing unit 216 may multiplex an input signal and output the multiplexed signal.

The first frame demultiplexing unit 206, the second frame demultiplexing unit 235, and the third frame demultiplexing unit 215 may demultiplex an input signal and output the demultiplexed signal.

The first WDM multiplexing unit 226 and the second WDM multiplexing unit 256 may combine signals having multiple wavelengths and output the combined result.

The first WDM demultiplexing unit 225 and the second WDM demultiplexing unit 255 may separate a signal having multiple wavelengths and output the separated signals.

The dual-rate optical transmission and reception unit 200 may separate wavelength signals having different transfer rates, and convert the separated wavelength signals to electric signals. For example, the dual-rate optical transmission and reception unit 200 may separate a burst-mode upstream wavelength signal received from CPE into a first burst-mode upstream wavelength signal having a first transfer rate and a second burst-mode upstream wavelength signal having a second transfer rate. The first burst-mode upstream wavelength signal from the dual-rate optical transmission and reception unit 200 may be converted into a first burst-mode upstream electric signal. The dual-rate optical transmission and reception unit 200 may convert the separated second burst-mode upstream wavelength signal into a second burst-mode upstream electric signal. For example, the first transfer rate may be greater than the second transfer rate. The first transfer rate may be 10 Gbps, and the second transfer rate may be 1 Gbps.

The continuous-mode wavelength converting unit 210 may convert the received burst-mode upstream electric signal into a continuous-mode upstream electric signal. For example, the continuous-mode wavelength converting unit 210 may include a first converting unit 211 and a second converting unit 212. The first converting unit 211 may convert the first burst-mode upstream electric signal which has the first transfer rate and is received from the first frame demultiplexing unit 206 into a first continuous-mode upstream electric signal having the first transfer rate. For example, the first converting unit 211 may insert a first frame at the front of the first burst-mode upstream electric signal as an indicator of a start of the signal. The first converting unit 211 may insert a second frame at the end of the first burst-mode upstream electric signal as an indicator of an end of the signal. The first converting unit 211 may insert an idle signal ahead of or following to the first burst-mode upstream electric signal having the first and second frames inserted therein. As a result, the first converting unit 211 can convert the burst-mode signal into a continuous-mode signal.

The second converting unit 212 may convert the second burst-mode upstream electric signal which has the second transfer rate and is received from the second frame demultiplexing unit 235 into a second continuous-mode upstream electric signal having the second transfer rate. For example, the second converting unit 212 may insert a third frame at the front of the second burst-mode upstream electric signal as an indicator of a start of the signal. The second converting unit 212 may insert a fourth frame at the end of the second burst-mode upstream electric signal as an indicator of an end of the signal. Moreover, the second converting unit 212 may insert an idle signal ahead of or following to the second burst-mode upstream electric signal having the third and fourth frames inserted therein. By inserting the idle signal ahead of or following to the second burst-mode upstream electric signal having the third and fourth frames inserted therein, the second converting unit 212 converts the burst-mode signal into a continuous-mode signal.

The second converting unit 212 may convert the second burst-mode upstream electric signal that is a parallel signal and received from the second frame demultiplexing unit 235 into the second continuous-mode electric signal as a series signal.

The first optical transmission and reception unit 220 may convert the first continuous-mode upstream electric signal received from the first converting unit 211 into a first continuous-mode upstream wavelength signal. For example, the first optical transmission and reception unit 220 may convert the first continuous-mode upstream electric signal into the first continuous-mode upstream wavelength signal of a coarse wavelength division multiplexing (CWDM) scheme. Alternatively, the first optical transmission and reception unit 220 may convert the first continuous-mode upstream electric signal into a first continuous-mode upstream wavelength signal of a dense wavelength division multiplexing (DWDM) scheme.

The first optical transmission and reception unit 220 may convert a first continuous-node downstream wavelength signal which has the first transfer rate and is received from the wavelength filter 220 via the first WDM demultiplexing unit 225 into a first continuous-mode downstream electric signal. For example, the first continuous-mode downstream electric signal may be transmitted to the dual-rate optical transmission and reception unit 200 via the third frame demultiplexing unit 215, the continuous-mode wavelength converting unit 210, and the first frame multiplexing unit 205. In this case, the third frame demultiplexing unit 215, the continuous-mode wavelength converting unit 210 and the first frame multiplexing unit 205 may function as bypasses to allow the first continuous-mode downstream electric signal to pass therethrough. As another example, the first continuous-mode downstream electric signal may be directly transmitted to the dual-rate optical transmission and reception unit 200.

The second optical transmission and reception unit 250 may convert the second continuous-mode upstream electric signal into a second continuous-mode upstream wavelength signal. For example, the second optical transmission and reception unit 250 may convert the second continuous-mode upstream electric signal into a second continuous-mode upstream wavelength signal of a DWDM scheme.

The second optical transmission and reception unit 250 may convert a second continuous-mode downstream wavelength signal which has the second transfer rate and is received from the wavelength filter 230 via the second WDM demultiplexing unit 255 into a second continuous-mode downstream electric signal. For example, the second continuous-mode downstream electric signal may be transmitted to the dual-rate optical transmission and reception unit 200 through the continuous-mode wavelength converting unit 210. In this case, neither a multiplexing unit nor a demultiplexing unit is required to multiplex or demultiplex the second continuous-mode downstream electric signal. As another example, the second continuous-mode downstream electric signal may be directly transmitted to the dual-rate optical transmission and reception unit 200.

The wavelength filter 230 may transmit the first continuous-mode upstream wavelength signal received from the first WDM unit 226 and the second continuous-mode upstream wavelength signal to a COT apparatus.

The wavelength filter 230 may separate a continuous-mode downstream wavelength signal received from the COT apparatus into the first continuous-mode downstream wavelength signal and the second continuous-mode downstream wavelength signal.

Hereinafter, transmission of an upstream wavelength signal will be described. The dual-rate optical transmission and reception unit 200 may separate a burst-mode upstream wavelength signal received from CPE into the first burst-mode upstream wavelength signal having the first transfer rate and the second burst-mode upstream wavelength signal having the second transfer rate. The dual-rate optical transmission and reception unit 200 may convert the first burst-mode upstream wavelength signal into the first burst-mode upstream electric signal. In addition, the dual-rate optical transmission and reception unit 200 may convert the second burst-mode upstream wavelength signal into the second burst-mode upstream electric signal.

In transmission of the first burst-mode upstream wavelength signal, the first frame demultiplexing unit 206 may demultiplex the first burst-mode upstream wavelength signal from the dual-rate optical transmission and reception unit 200 and transmit the demultiplexed signal to the first converting unit 211.

The first converting unit 211 may convert the first burst-mode upstream electric signal which has the first transfer rate and is received from the first frame demultiplexing unit 205 into the first continuous-mode upstream electric signal having the first transfer rate. The first converting unit 211 may transmit the first continuous-mode upstream electric signal to the third frame multiplexing unit 216.

The third frame multiplexing unit 216 may multiplex the first continuous-mode upstream electric signal received from the first converting unit 211 and transmit the multiplexed signal to the first optical transmission and reception unit 220.

The first optical transmission and reception unit 220 may convert the first continuous-mode upstream electric signal received from the third frame multiplexing unit 216 into the first continuous-mode upstream wavelength signal. The first optical transmission and reception unit 220 may transmit the first continuous-mode upstream wavelength signal to the first WDM unit 226.

The first WDM unit 226 may multiplex the first continuous-mode upstream wavelength signal and transmit the multiplexed signal to the wavelength filter 230.

In transmission of the second burst-mode upstream wavelength signal, the second frame demultiplexing unit 235 may demultiplex the second burst-mode upstream electric signal received from the dual-rate optical transmission and reception unit 200 and transmit the demultiplexed signal to the second converting unit 212.

The second converting unit 212 may convert the second burst-mode upstream electric signal which has the second transfer rate and is received from the second frame demultiplexing unit 235 into the second continuous-mode upstream electric signal having the second transfer rate. The second converting unit 212 may convert the second burst-mode upstream electric signal that is a parallel signal into the second continuous-mode upstream electric signal as a serial signal.

The second optical transmission and reception unit 250 may convert the second continuous-mode upstream electric signal received from the second converting unit 212 into a second continuous-mode upstream wavelength signal. The second optical transmission and reception unit 250 may transmit the second continuous-mode upstream wavelength signal to the second WDM unit 256.

The second WDM unit 256 may multiplex the second continuous-mode upstream wavelength signal and transmit the multiplexed signal to the wavelength filter 230.

The wavelength filter 230 may transmit both the first continuous-mode upstream wavelength signal from the first WDM unit 226 and the second continuous-mode upstream wavelength signal from the second WDM unit 256 to the COT apparatus.

Hereinafter, transmission of the downstream wavelength signal will be described. The wavelength filter 230 may separate a continuous-mode downstream wavelength signal into the first continuous-mode downstream wavelength signal and the second continuous-mode downstream wavelength signal.

The first continuous-mode downstream wavelength signal having the first transfer rate, the first WDM demultiplexing unit 225 may demultiplex the first continuous-mode downstream wavelength signal from the wavelength filter 230 and transmit the demultiplexed signal to the first optical transmission and reception unit 220.

The first optical transmission and reception unit 220 may convert the first continuous-mode downstream wavelength signal from the first WDM demultiplexing unit 225 into the first continuous-mode downstream electric signal. The first optical transmission and reception unit 220 may transmit the first continuous-mode downstream electric signal to the third frame demultiplexing unit 215.

The first continuous-mode downstream electric signal may be transmitted to the dual-rate optical transmission and reception unit 200 through the third frame demultiplexing unit 215, the first converting unit 211, and the first frame multiplexing unit 205. In this case, the third frame demultiplexing unit 215, the continuous-mode wavelength converting unit 210 and the first frame multiplexing unit 205 may act as bypasses to allow the first continuous-mode downstream electric signal to pass therethrough.

In transmission of the second continuous-mode downstream wavelength signal having the second transfer, the second WDM demultiplexing unit 255 may demultiplex the second continuous-mode downstream wavelength signal received from the wavelength filter 230, and transmit the demultiplexed signal to the second optical transmission and reception unit 250.

The second optical transmission and reception unit 250 may convert the second continuous mode downstream wavelength signal received from the second WDM demultiplexing unit 255 into the second continuous-mode downstream electric signal. In addition, the second optical transmission and reception 250 may transmit the second continuous-mode downstream electric signal to the second converting unit 212. The second converting unit 212 may transmit the second continuous-mode downstream electric signal to the dual-rate optical transmission and reception unit 200. In this case, the second converting unit 212 may act as a bypass.

The dual-rate optical transmission and reception unit 200 may convert the continuous-mode downstream electric signal and the second continuous-mode downstream electric signal into the first and second continuous-mode downstream wavelength signals, respectively, and transmit the converted first and second continuous-mode downstream wavelength signals to the CPE.

Figure 3:
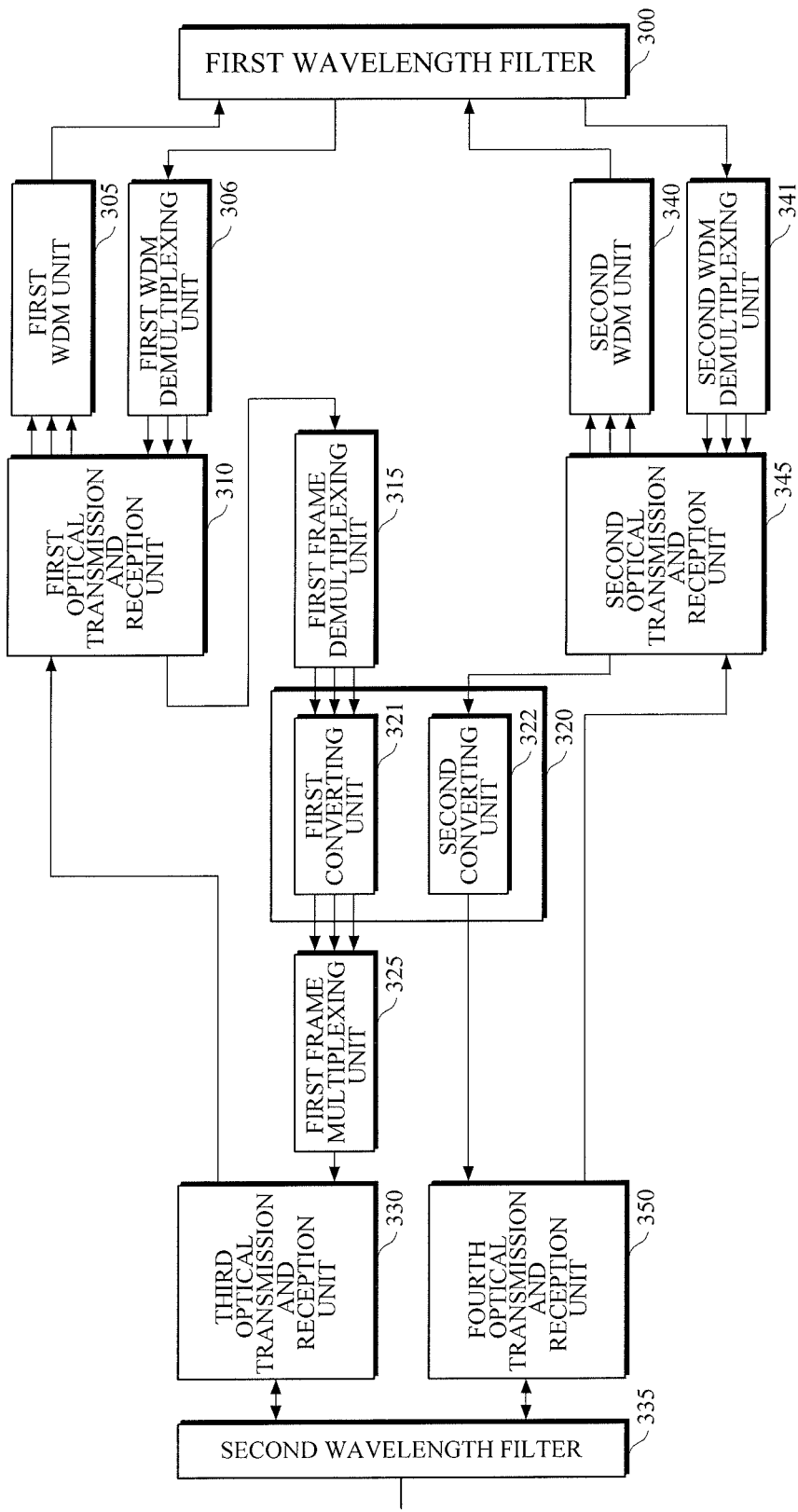
FIG. 3 is a diagram illustrating an example of a central office termination (COT) apparatus shown in the example illustrated in FIG. 1.

FIG. 3 illustrates an example of the COT apparatus shown in the example illustrated in FIG. 1.

Referring to FIG. 3, the COT apparatus may include a first wavelength filter 300, a first WDM unit 305, a first WDM demultiplexing unit 306, a first optical transmission and reception unit 310, a first frame demultiplexing unit 315, a burst-mode wavelength converting unit 320, a first frame multiplexing unit 325, a third optical transmission and reception unit 330, a second wavelength filter 335, a second WDM unit 340, a second WDM demultiplexing unit 341, a second optical transmission and reception unit 345, and a fourth optical transmission and reception unit 350.

The first wavelength filter 300 may separate a continuous-mode upstream wavelength signal received from a RT apparatus into a first continuous-mode upstream wavelength signal having a first transfer rate and a second continuous-mode upstream wavelength signal having a second transfer rate.

The first wavelength filter 300 may transmit both a first continuous-mode downstream wavelength signal received from the first WDM unit 305 and a second continuous-mode downstream wavelength signal received from the second WDM unit 340 to the RT apparatus.

The first optical transmission and reception unit 310 may convert the first continuous-mode upstream which has the first transfer rate and is received from the first WDM demultiplexing unit 306 into a first continuous-mode upstream electric signal. The first optical transmission and reception unit 310 may transmit the first continuous-mode upstream electric signal to the first frame multiplexing unit 315. For example, the first optical transmission and reception unit 310 may convert the first continuous-mode upstream electric signal into a first continuous-mode upstream wavelength signal of a CWDM scheme.

Alternatively, the first optical transmission and reception unit 310 may convert the first continuous-mode upstream electric signal into a first continuous-mode upstream wavelength signal of a DWDM scheme.

The first optical transmission and reception unit 310 may convert a first continuous-mode downstream electric signal received from the third optical transmission and reception unit 330 into the first continuous-mode downstream wavelength signal. The first optical transmission and reception unit 310 may transmit the second continuous-mode downstream wavelength signal to the first WDM unit 305.

The second optical transmission and reception unit 345 may convert the second continuous-mode upstream wavelength signal which as the second transfer rate and is received from the second WDM demultiplexing unit 341 into the second continuous-mode upstream electric signal. The second optical transmission and reception unit 310 may transmit the second continuous-mode upstream electric signal to the second converting unit 322. For example, the second optical transmission and reception unit 310 may convert the second continuous-mode upstream electric signal into a second continuous-mode upstream wavelength signal of a DWDM scheme.

The second optical transmission and reception unit 345 may convert the second continuous-mode downstream electric signal received from the fourth optical transmission and reception unit 350 into the second continuous-mode downstream wavelength signal. The second optical transmission and reception unit 345 may transmit the converted second continuous-mode downstream wavelength signal to the second WDM unit 340.

The burst-mode wavelength converting unit 320 may include a first converting unit 321 and a second converting unit 322. The first converting unit 321 may convert the first continuous-mode upstream electric signal received from the first frame demultiplexing unit 315 into the first burst-mode upstream electric signal.

For example, the first converting unit 321 may extract frames from the first continuous-mode upstream electric signal, wherein the frames indicate the start and the end of the signal. The first converting unit 321 may extract the first burst-mode upstream electric signal based on the extracted frames. For example, the first converting unit 321 may extract a signal present between the extracted frames as the first burst-mode upstream electric signal.

The second converting unit 322 may convert the second continuous-mode upstream electric signal received from the second optical transmission and reception unit 345 into the second burst-mode upstream electric signal. For example, the second converting unit 322 may extract frames from the second continuous-mode upstream electric signal, wherein the frames indicate the start and the end of the signal. The second converting unit 322 may extract the second burst-mode upstream electric signal based on the extracted frames. For example, the second converting unit 322 may extract a signal present between the extracted frames as the second burst-mode upstream electric signal.

The third optical transmission and reception unit 330 may convert the first burst-mode upstream electric signal received from the first frame multiplexing unit 325 into the first burst-mode upstream wavelength signal. The third optical transmission and reception unit 330 may transmit the first burst-mode upstream wavelength signal to the second wavelength filter 335.

The third optical transmission and reception unit 330 may convert the first continuous-mode downstream wavelength signal which has the first transfer rate and is received from the second wavelength filter 335 into the first continuous-mode downstream electric signal. In addition, the third optical transmission and reception unit 330 may transmit the first continuous-mode downstream electric signal to the first optical transmission and reception unit 310.

The fourth optical transmission and reception unit 350 may convert the second burst-mode upstream electric signal received from the second converting unit 322 into the second burst-mode upstream wavelength signal. The fourth optical transmission and reception unit 350 may transmit the second burst-mode upstream wavelength signal to the second wavelength filter 335.

The fourth optical transmission and reception unit 350 may convert the second continuous-mode downstream wavelength signal which as the second transfer rate and is received from the second wavelength filter 335 into the second continuous-mode downstream electric signal. The fourth optical transmission and reception unit 350 may transmit the second continuous-mode downstream electric signal to the second optical transmission and reception unit 345.

The second wavelength filter 335 may transmit both the first burst-mode upstream wavelength signal and the second burst-mode upstream wavelength signal to an EPON OLT.

The second wavelength filter 335 may separate the continuous-mode downstream wavelength signal received from the EPON OLT into the first continuous-mode downstream wavelength signal having the first transfer rate and the second continuous-mode downstream wavelength signal having the second transfer rate. The second wavelength filter 335 may transmit the first continuous-mode downstream wavelength signal to the third optical transmission and reception unit 330 and the second continuous-mode downstream wavelength signal to the fourth optical transmission and reception unit 350.

Hereinafter, transmission of an upstream wavelength signal will now be described.

The first wavelength filter 300 may separate the continuous-mode upstream wavelength signal received from the RT apparatus into a first continuous-mode upstream wavelength signal having the first transfer rate and a second continuous-mode upstream wavelength signal having the second transfer rate.

In transmission of the first continuous-mode upstream wavelength signal having the first transfer rate, the first WDM demultiplexing unit 306 may demultiplex the first continuous-mode upstream wavelength signal and transmit the demultiplexed signal to the first optical transmission and reception unit 310.

The first optical transmission and reception unit 310 may convert the first continuous-mode upstream wavelength signal which has the first transfer rate and is received from the first WDM demultiplexing unit 306 into a first continuous-mode upstream electric signal. The first optical transmission and reception unit 310 may transmit the first continuous-mode upstream electric signal to the first frame multiplexing unit 315.

The first frame demultiplexing unit 315 may demultiplex the first continuous-mode upstream electric signal and transmit the demultiplexed signal to the first converting unit 321.

The first converting unit 321 may convert the first continuous-mode upstream electric signal received from the first frame demultiplexing unit 315 into a first burst-mode upstream electric signal. The first converting unit 321 may transmit the first burst-mode upstream electric signal to the first frame multiplexing unit 325.

The first frame multiplexing unit 325 may multiplex the first burst-mode upstream electric signal received from the first converting unit. The first frame multiplexing unit 325 may transmit the first burst-mode upstream electric signal to the third optical transmission and reception unit 330.

The third optical transmission and reception unit 330 may convert the first burst-mode upstream electric signal received from the first frame multiplexing unit 325 into the first burst-mode upstream wavelength signal. The third optical transmission and reception unit 330 may transmit the first burst-mode upstream wavelength signal to the second wavelength filter 335.

In transmission of the second continuous-mode upstream wavelength signal having the second transfer rate, the second WDM demultiplexing unit 341 may demultiplex the second continuous-mode upstream wavelength signal and transmit the demultiplexed signal to the second optical transmission and reception unit 345.

The second optical transmission and reception unit 345 may convert the second continuous-mode upstream wavelength signal received from the second WDM demultiplexing unit 341 into the second continuous-mode upstream electric signal. In addition, the second optical transmission and reception unit 345 may transmit the converted second continuous-mode upstream electric signal to the second converting unit 322.

The second converting unit 322 may convert the second continuous-mode upstream electric signal received from the second optical transmission and reception unit 345 into a second burst-mode upstream electric signal. The second converting unit 322 may transmit the second burst-mode upstream electric signal to the fourth optical transmission and reception unit 350.

The fourth optical transmission and reception unit 350 may convert the second burst-mode upstream electric signal received from the second converting unit 322 into a second burst-mode upstream wavelength signal. In addition, the fourth optical transmission and reception unit 350 may transmit the second burst-mode upstream wavelength signal to the second wavelength filter 335.

The second wavelength filter 335 may transmit both the first burst-mode upstream wavelength signal received from the third optical transmission and reception unit 330 and the second burst-mode upstream wavelength signal received from the fourth optical transmission and reception unit 350 to the EPON OLT.

Hereinafter, transmission of a downstream wavelength signal will now be described.

The second wavelength filter 335 may separate a continuous-mode downstream wavelength signal received from the EPON OLT into the first continuous-mode downstream wavelength signal having the first transfer rate and the second continuous-mode downstream wavelength signal having the second transfer rate. The second wavelength filter 335 may transmit the first continuous-mode downstream wavelength signal to the third optical transmission and reception unit 330, and the second continuous-mode downstream wavelength signal to the fourth optical transmission and reception unit 350.

In transmission of the first continuous-mode downstream wavelength signal having the first transfer rate, the third optical transmission and reception unit 330 may convert the first continuous-mode downstream wavelength signal received from the second wavelength filter into the first continuous-mode downstream electric signal. The third optical transmission and reception unit 330 may transmit the first continuous-mode downstream electric signal to the first optical transmission and reception unit 310.

The first optical transmission and reception unit 310 may convert the first continuous-mode downstream electric signal received from the third optical transmission and reception unit 330 into the first continuous-mode downstream wavelength signal. In addition, the first optical transmission and reception unit 310 may transmit the first continuous-mode downstream wavelength signal to the first WDM unit 305.

The first WDM unit 305 may transmit the first continuous-mode downstream wavelength signal received from the first optical transmission and reception unit 310 to the first wavelength filter 300.

In transmission of the second continuous-mode downstream wavelength signal having the second transfer rate, the fourth optical transmission and reception unit 350 may convert the second continuous-mode downstream wavelength signal received from the second wavelength filter 335 into the second continuous-mode downstream electric signal. The fourth optical transmission and reception unit 350 may transmit the second continuous-mode downstream electric signal to the second optical transmission and reception unit 345.

The second optical transmission and reception unit 345 may convert the second continuous-mode downstream electric signal received from the fourth optical transmission and reception unit 350 into the second continuous-mode downstream wavelength signal. The second optical transmission and reception unit 345 may transmit the converted second continuous-mode downstream wavelength signal to the second WDM unit 340.

The second WDM unit 340 may transmit the second continuous-mode downstream wavelength signal received from the second optical transmission and reception unit 345 to the first wavelength filter 300.

The first wavelength filter 300 may transmit both the first continuous-mode downstream wavelength signal received from the first WDM unit 305 and the second continuous-mode downstream wavelength signal received from the second WDM unit 340 to the RT apparatus.

Figure 4:
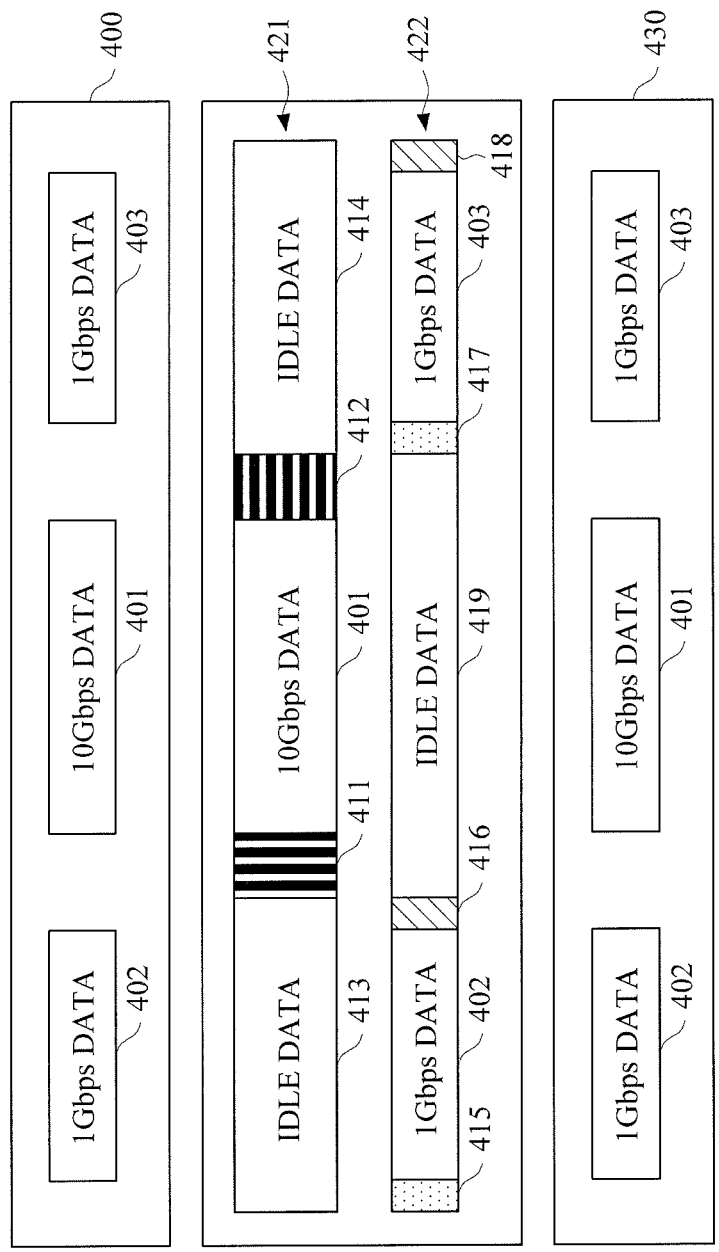
FIG. 4 is an illustration showing a method of converting a wavelength signal by the continuous-mode wavelength converting apparatus shown in FIG. 2 and the burst-mode wavelength converting apparatus shown in FIG. 3.

FIG. 4 is an illustration showing a method of converting a wavelength signal by the continuous-mode wavelength converting apparatus shown in FIG. 2 and the burst-mode wavelength converting apparatus shown in FIG. 3.

Referring to FIGS. 2, 3, and 4, a first burst-mode upstream electric signal 401 and two second burst-mode upstream electric signals 402 and 403 which are included in the burst-mode upstream signal 400 are transmitted in burst-mode, and thus they are not simultaneously applied, but sequentially applied to the burst-mode wavelength converting apparatus. The first converting unit 211 of the burst-mode wavelength converting apparatus may receive the first burst-mode upstream electric signal 401 having a first transfer rate of 10 Gbps from the first frame demultiplexing unit 206.

The first converting unit 211 may convert the first burst-mode upstream electric signal 401 into a first continuous-mode upstream electric signal 421 by adding a first frame 411, a second frame 412 and idle signals 413 and 414 to the first burst-mode upstream electric signal 401. For example, in more detail, the first converting unit 211 may insert the first frame 411 at the front of the first burst-mode upstream electric signal 401 as an indicator of a start of the signal 401. The first converting unit 211 may insert the second frame 412 at the end of the first burst-mode upstream electric signal 401 as an indicator of an end of the signal 401. The first converting unit 211 may insert the idle signal into at least one remaining region 413 and 414.

The second converting unit 212 of the continuous-mode wavelength converting apparatus may receive the second burst-mode upstream electric signals 402 and 403, each having a second transfer rate of 1 Gbps, from the second frame demultiplexing unit 235.

The second converting unit 212 may convert the second burst-mode electric signals 402 and 403 into a second continuous-mode upstream electric signal 422 by adding third frames 415 and 417, fourth frames 416 and 418, and an idle signal 419 to the second burst-mode upstream electric signal 402 and 403. For example, the second converting unit 212 may insert the third frames 415 and 417 at the front of the respective second burst-mode upstream electric signals 402 and 403 as indicators of start of the signals 402 and 403. The second converting unit 212 may insert the fourth frames 416 and 418 at the end of the respective second burst-mode upstream electric signals 402 and 403 as indicators of end of the signals 402 and 403. In addition, the second converting unit 212 may add an idle signal to at least one remaining region 419.

A COT apparatus may include the burst-mode converting apparatus. The burst-mode converting apparatus may extract the first and the second frames 411 and 412 as indicators of the start and the end of the first burst-mode upstream electric signal 401 from the first continuous-mode upstream electric signal 421. The first converting unit 321 may extract the first burst-mode upstream electric signal 401 based on the extracted frames. For example, the first converting unit 321 may extract a signal present between the extracted first and second frames 411 and 412 as the first burst-mode upstream electric signal 401.

The second converting unit 322 may extract the third frames 415 and 417 and the fourth frames 416 and 418 as indicators of the start and the end of the respective second continuous-mode upstream electric signals 402 and 403 from the second continuous-mode upstream electric signal 422. The second converting unit 322 may extract the second burst-mode upstream electric signals 402 and 403 based on the extracted third and fourth frames 415, 416, 417, and 418. For example, the second converting unit 322 may extract a signal between the third frame 415 (or 417) and the fourth frame 416 (or 418) as the second burst-mode upstream electric signal 402 (or 403).

Hence, the COT apparatus may convert the burst-mode upstream electric signal 430 including the first burst-mode upstream electric signal 401 and the second burst-mode upstream electric signals 402 and 403 into a burst-mode upstream wavelength signal. The COT apparatus may transmit the converted burst-mode upstream wavelength signal to the EPON OLT.

As such, the RT apparatus may convert the received burst-mode upstream wavelength signal into a continuous-mode upstream wavelength signal and transmit the converted continuous-mode upstream wavelength signal to the COT apparatus, and the COT apparatus may convert the received continuous-mode upstream wavelength signal into a burst-mode upstream wavelength signal and transmit the converted burst-mode upstream wavelength signal to the EPON OLT.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical transmission and reception system for an optical network comprising:
 a remote termination apparatus configured to separate a burst-mode upstream wavelength signal received from a first apparatus into a first burst-mode upstream wavelength signal and a second burst-mode upstream wavelength signal and to convert the first burst-mode upstream wavelength signal and the second burst-mode upstream wavelength signal into a first continuous-mode upstream wavelength signal and a second continuous-mode upstream wavelength signal, respectively, in a wavelength division multiplexing (WDM) scheme; and
 a central office termination (COT) apparatus configured to receive the first continuous-mode upstream wavelength signal and the second continuous-mode upstream wavelength signal from the remote termination apparatus, to convert the first continuous-mode upstream wavelength signal and the second continuous-mode upstream wavelength signal into the first burst-mode upstream wavelength signal and the second burst-mode upstream wavelength, respectively, and to transmit the converted wavelength signals to a second apparatus, wherein a transfer rate of the first burst-mode upstream wavelength signal is different from a transfer rate of the second burst-mode upstream wavelength signal.

2. The optical transmission and reception system of claim 1, wherein the remote termination apparatus comprises:
a dual-rate optical transmission and reception unit configured to receive the burst-mode upstream wavelength signal from the first apparatus, separate the received burst-mode upstream wavelength signal into the first burst-mode upstream wavelength signal and the second burst-mode upstream wavelength signal, and convert the first burst-mode upstream wavelength signal and the second burst-mode upstream wavelength signal into a first burst-mode upstream electric signal and a second burst-mode upstream electric signal, respectively;
a continuous-mode wavelength converting unit comprising:
a first converting unit configured to convert the first burst-mode upstream electric signal into a first continuous-mode upstream electric signal by inserting a first frame at a front of the first burst-mode upstream electric signal, inserting a second frame at an end of the first burst-mode upstream electric signal, and adding an idle signal to a remaining region of the first burst-mode upstream electric signal; and
a second converting unit configured to convert the second burst-mode upstream electric signal into a second continuous-mode upstream electric signal by inserting a third frame at a front of the second burst-mode upstream electric signal, inserting a fourth frame at an end of the second burst-mode upstream electric signal, and adding an idle signal to a remaining region of the second burst-mode upstream electric signal;
a first optical transmission and reception unit configured to convert the first continuous-mode upstream electric signal into a first continuous-mode upstream wavelength signal of a coarse wavelength division multiplexing (CWDM) scheme or a dense wavelength division multiplexing (DWDM) scheme, and output the first continuous-mode upstream wavelength signal;
a second optical transmission and reception unit configured to convert the second continuous-mode upstream electric signal into a second continuous-mode upstream wavelength signal of a CWDM scheme or a DWDM scheme; and
a wavelength filter configured to combine the first continuous-mode upstream wavelength signal and the second continuous-mode upstream wavelength signal and transmit a resultant signal to the COT apparatus.

3. The optical transmission and reception system of claim 2, wherein the remote termination apparatus further comprises:
a first frame demultiplexing unit configured to demultiplex the first burst-mode upstream electric signal and transmit the demultiplexed signal to the first converting unit;
a second frame demultiplexing unit configured to demultiplex the second burst-mode upstream electric signal and transmit the demultiplexed signal to the second converting unit;
a third frame multiplexing unit configured to multiplex the first continuous-mode upstream electric signal and transmit the multiplexed signal to the first optical transmission and reception unit;
a first wavelength division multiplexing (WDM) unit configured to multiplex the first continuous-mode upstream wavelength signal and transmit the multiplexed signal to the wavelength filter; and
a second WDM unit configured to multiplex the second continuous-mode upstream wavelength signal and transmit the multiplexed signal to the wavelength filter.

4. The optical transmission and reception system of claim 2, wherein:
the wavelength filter is configured to separate a continuous-mode downstream wavelength signal received from the remote termination apparatus into a first continuous-mode downstream wavelength signal and a second continuous-mode downstream wavelength signal,
the first optical transmission and reception unit is configured to convert the first continuous-mode downstream wavelength signal into a first continuous-mode downstream electric signal, the second optical transmission and reception unit is configured to convert the second continuous-mode downstream wavelength signal into a second continuous-mode downstream electric signal, and
the dual-rate optical transmission and reception unit is configured to convert the first continuous-mode downstream electric signal and the second continuous-mode downstream electric signal into a first continuous-mode downstream wavelength signal and a second continuous-mode downstream wavelength signal, respectively, and output the first and second continuous-mode downstream wavelength signals.

5. The optical transmission and reception system of claim 1, wherein the COT apparatus comprises:
a first wavelength filter configured to separate the continuous-mode upstream wavelength signal received from the remote termination apparatus into a first continuous-mode upstream wavelength signal and a second continuous-mode upstream wavelength signal;
a first optical transmission and reception unit configured to convert the first continuous-mode upstream wavelength signal into a first continuous-mode upstream electric signal;
a second optical transmission and reception unit configured to convert the second continuous-mode upstream wavelength signal into a second continuous-mode upstream electric signal;
a burst-mode wavelength converting unit comprising a first converting unit configured to extract frames as indicators of a start and an end of the first burst-mode upstream electric signal from the first continuous-mode upstream electric signal and extract the first burst-mode upstream electric signal based on the extracted frames, and a second converting unit configured to extract frames as indicators of a start and an end of the second burst-mode upstream electric signal from the second continuous-mode upstream electric signal and extract the second burst-mode upstream electric signal based on the extracted frames;
a third optical transmission and reception unit configured to convert the first burst-mode upstream electric signal into the first burst-mode upstream wavelength signal;

a fourth optical transmission and reception unit configured to convert the second burst-mode upstream electric signal into the second burst-mode upstream wavelength signal; and a second wavelength filter configured to combine the first burst-mode upstream wavelength signal and the second burst-mode upstream wavelength signal and transmit a resultant signal to the second apparatus.

6. The optical transmission and reception system of claim 5, wherein the COT apparatus further comprises:

a first WDM demultiplexing unit configured to demultiplex the first continuous-mode upstream wavelength signal and transmit the demultiplexed signal to the first optical transmission and reception unit;

a second WDM demultiplexing unit configured to demultiplex the second continuous-mode upstream wavelength signal and transmit the demultiplexed signal to the second optical transmission and reception unit;

a first frame demultiplexing unit configured to demultiplex the first continuous-mode upstream electric signal received from the first optical transmission and reception unit and transmit the demultiplexed signal to the first converting unit; and the first frame multiplexing unit configured to multiplex the first burst-mode upstream electric signal and transmit the multiplexed signal to the third optical transmission and reception unit.

7. The optical transmission and reception system of claim 5, wherein:

the second wavelength filter is configured to separate a continuous-mode downstream wavelength signal received from the second apparatus into a first continuous-mode downstream wavelength signal and a second continuous-mode downstream wavelength signal and output the first and second continuous-mode downstream wavelength signals, the third optical transmission and reception unit is configured to convert the first continuous-mode downstream wavelength signal into a first continuous-mode downstream electric signal and output the first continuous-mode downstream electric signal, the fourth optical transmission and reception unit is configured to convert the second continuous-mode downstream wavelength signal into a second continuous-mode downstream electric signal and output the second continuous-mode downstream electric signal, the first optical transmission and reception unit is configured to convert the first continuous-mode downstream wavelength signal into a first continuous-mode downstream electric signal and output the first continuous-mode downstream electric signal, the second optical transmission and reception unit is configured to convert the second continuous-mode downstream wavelength signal into a second continuous-mode downstream electric signal and output the second continuous-mode downstream electric signal, and the first wavelength filter is configured to convert the first continuous-mode downstream electric signal and the second continuous-mode downstream electric signal into a first continuous-mode downstream wavelength signal and a second continuous-mode downstream wavelength signal, respectively, and output the first and second continuous-mode downstream wavelength signals.

* * * * *